UNITED STATES PATENT OFFICE.

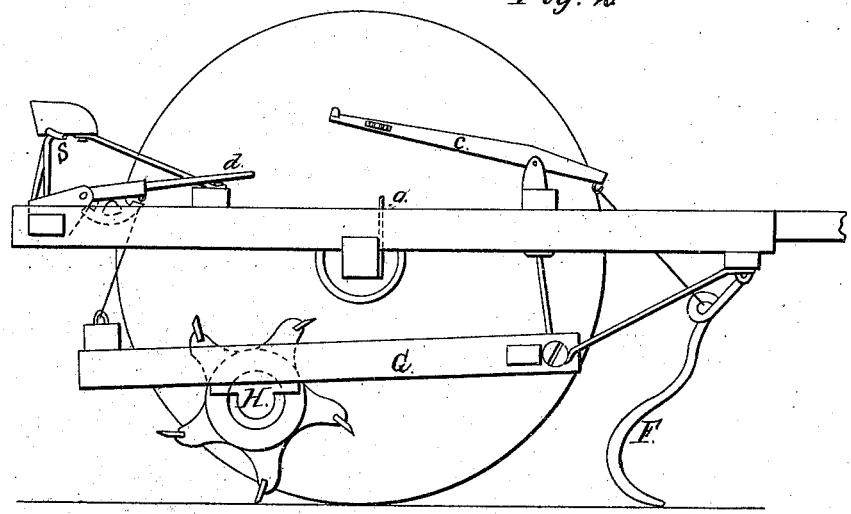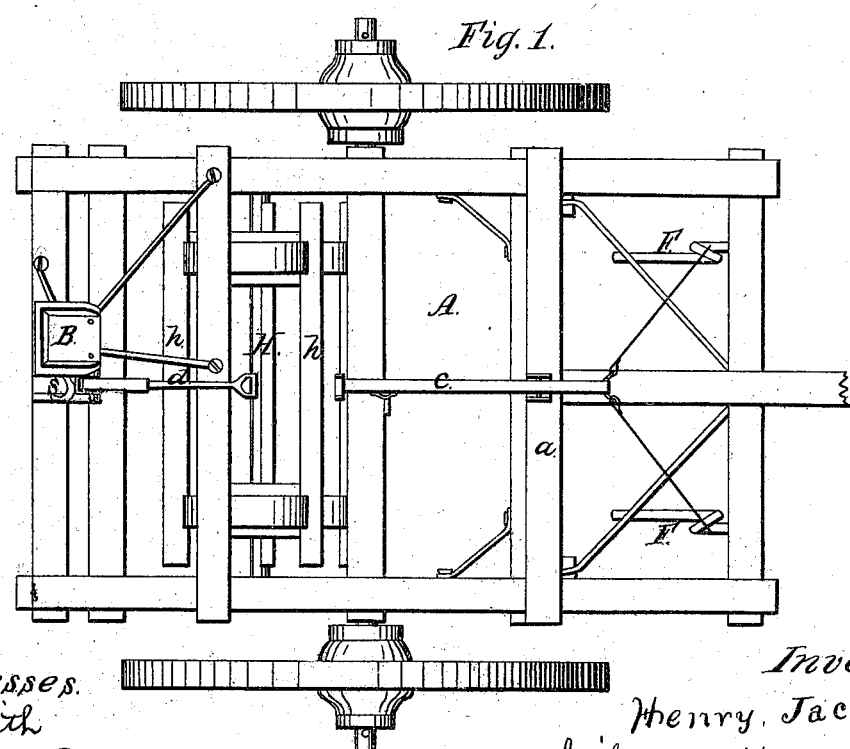

HENRY JACKSON, OF ELMIRA, ILLINOIS.

IMPROVEMENT IN CORNSTALK-CUTTERS.

Specification forming part of Letters Patent No. 87,676, dated March 9, 1869.

*To all whom it may concern:*

Be it known that I, HENRY JACKSON, of Elmira, in the county of Stark and State of Illinois, have invented a new and useful Improvement in Cornstalk-Cutters; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a plan view of my cornstalk-cutter, and Fig. 2 is a sectional view thereof.

My invention relates to that class of devices designed for cutting cornstalks in the field into small fragments, to the end that they shall cease to form impediments to the plow and may be turned under the soil to serve as fertilizers.

The letter A of the drawings represents a rectangular frame adjusted upon the axle of a two-wheeled carriage in the manner shown.

Letter B is the neap.

$a$ is a cross-bar in front of the axle, and $b$ is a cross-bar in the rear thereof.

Letter $B^2$ represents the driver's seat.

$c$ is a lever attached to the hooks F, as hereinafter mentioned, and $d$ is a lever attached to the rear end of the swinging frame, as also mentioned hereinafter. Lever $c$ is pivoted on the top of cross-bar $a$, and lever $d$ is hinged to the rear bar of the frame A, as shown.

The letters F represent hooks hinged to the front end of frame A, and are connected with lever $c$ by chains or ropes in the manner shown on the drawings. The office of these hooks is to straighten the cornstalks upon the ground lengthwise with the passing carriage, and thereby preparing them for the visits of the revolving cutters, hereinafter described. These hooks are raised or lowered by means of the lever $c$.

The letter G is a swinging frame, suspended below the carriage-axle by means of rods or chains extending from its front beam to the front beam of the frame A as shown, and also by rods or chains that extend directly upward to the frame A below cross-bar $a$. It is also suspended at its rear end by a chain connecting it with the lever $d$, as shown.

The letter H is a revolving cylinder adjusted in staples or other suitable bearings below the frame G. This cylinder is constructed with four or more knives or cutters adjusted in the manner represented on Fig. 2. These knives are marked $h$ on the drawings.

The letter $o$ is a catch designed to hold the lever $c$ when desirable, and thereby hold the hooks F suspended from the ground whenever the operator shall deem it proper so to do; and letter $s$ is a hook at the side of the driver's seat for the purpose of holding the lever $d$, and thereby suspending the swinging frame above the ground when deemed proper or desirable.

To operate my cornstalk-cutter I attach the team to the neap and draw the carriage through the cornstalks. The frames respectively press the stalks downward, the hooks F arrange them in a longitudinal position upon the ground, and the revolving cylinder, operating with its knives $h$, cuts them into small sections or fragments. The altitude of the frame G is regulated by the lever $d$, while the position of hooks F is regulated by the lever $c$.

I do not claim broadly the cutting-cylinder nor the hooks herein described and shown; but

What I claim as my invention, and desire to secure by Letters Patent, is—

An improved cornstalk-cutter, having levers $c$ and $d$, catch $o$, and hook $s$, cylinder H, with knives $h$, all combined with frames A and G, and constructed, arranged, and operating substantially as herein specified.

In witness that I claim the above I have hereunto subscribed my name in the presence of two witnessess.

HENRY JACKSON.

Witnesses:
GEO. PUTERBAUGH,
E. S. WHITTLESEY.